Dec. 17, 1946. F. D. SNYDER Re 22,821
CONTROL SYSTEM
Original Filed Aug. 25, 1944
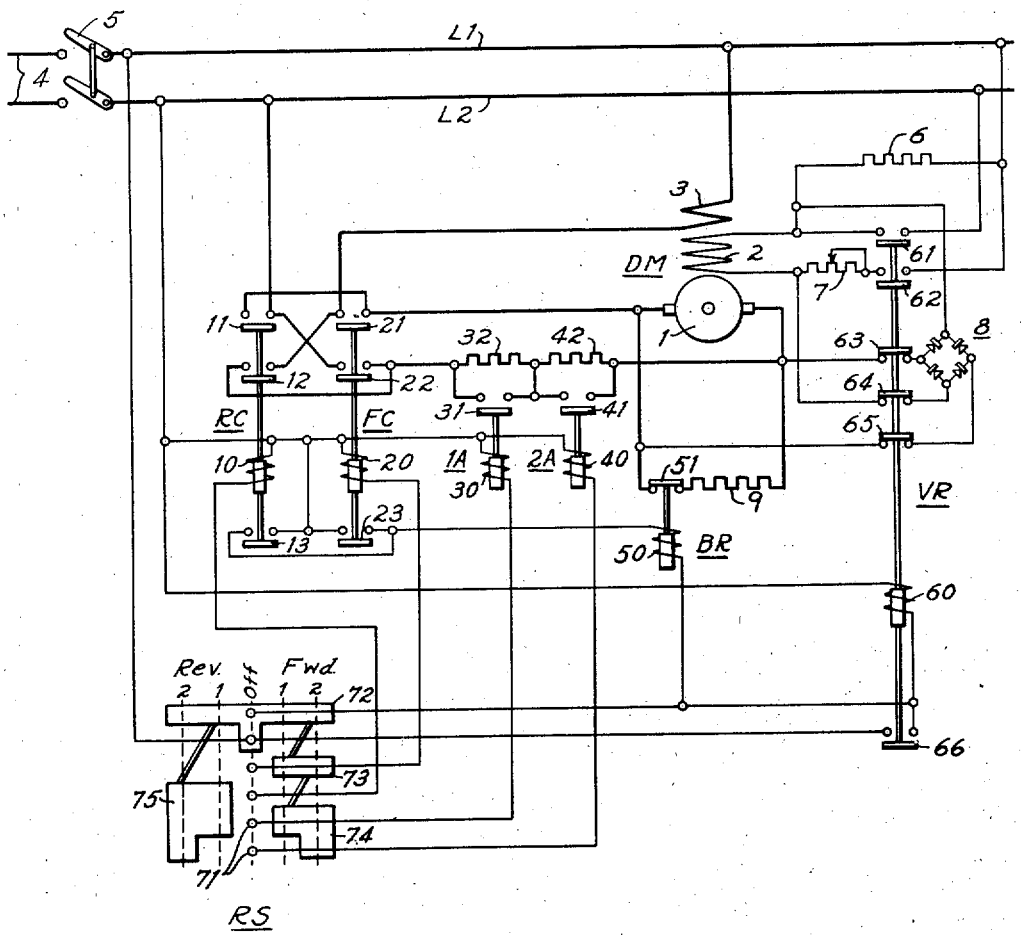
WITNESSES:
James F. Young
Leon J. Taza
INVENTOR
Frederick D. Snyder.
BY
Paul E. Friedemann
ATTORNEY Reissued Dec. 17, 1946

Re. 22,821

UNITED STATES PATENT OFFICE 22,821

CONTROL SYSTEM

Frederick D. Snyder, Milton, Mass., assignor to Westinghouse Electric Corporation, East Pittsburgh, Pa., a corporation of Pennsylvania Original No. 2,397,214, dated March 26, 1946, Serial No. 551,117, August 25, 1944. Application for reissue September 10, 1946, Serial No. 695,833

5 Claims. (Cl. 172—179)

My invention relates to controls for direct-current shunt motors and aims chiefly at providing a simple and reliable control system that secures a satisfactory dynamic braking of the motor even in cases of voltage failure or upon accidental or inadvertent interruption of the current supply.

According to the invention, the control and energizing circuit of a reversible direct-current shunt motor is provided with a rectifier and contains a voltage responsive relay which connects the shunt field winding of the motor to the energizing current line only when the line voltage is above a safe value but connects the field winding through the rectifier across the motor armature when the line voltage drops below the safe value. As a result, the field winding is excited by armature voltage in the direction to stop the motor whenever the voltage becomes unduly low and regardless of the running direction of the motor at the time of voltage failure.

According to another feature of the invention, a dynamic braking resistor is provided and is controlled by the above-mentioned voltage responsive relay so that it is automatically connected across the armature whenever the relay reacts to voltage failure.

These and other features of the invention will be apparent from the following description of the embodiment illustrated in the drawing.

The drawing shows the circuit diagram of a direct-current shunt motor DM to be used for driving a machine tool or other apparatus which requires a reversal in running direction. The motor DM has an armature 1, a main field winding 2 designed as a separately excited shunt field winding and an interpole or compensating series field winding 3.

The motor is energized from the leads L1 and L2 of a direct-current line 4 through a main switch 5. The shunt field winding 2 is connected with leads L1 and L2 by a relay controlled circuit which includes a discharge resistor 6 and a calibrating rheostat 7. Connected with the shunt field winding 2 is further a rectifier unit 8 consisting, for instance, of a bridge arrangement of dry or junction type rectifiers. A resistor 9 is provided for connection across the armature 1 in order to obtain dynamic braking. Two further resistors, denoted by 32 and 42, serve for starting the motor.

The connection of the armature and field windings of the motor with the above-mentioned auxiliary devices is controlled by a system of relays which includes two reversing contactors RC and FC, two accelerating contactors 1A and 2A, a brake relay BR and a voltage responsive relay VR. These relays are under control by a reversing master switch denoted by RS.

The line contactors RC and FC have each an energizing coil 10 and 20, respectively, for actuating two main contacts 11, 12 and 21, 22 and one interlock contact 13 and 23, respectively. The accelerating relays 1A and 2A have each a coil 30 and 40 for actuating a contact 31 and 41, respectively. The brake relay BR has a coil 50 and a control contact 51. The voltage relay is provided with six contacts denoted by numerals 61 through 66. The master controller has stationary contact fingers, such as those denoted by 71, and is provided with contact segments 72, 73, 74 and 75. These segments are electrically interconnected.

All parts of the illustrated control system are shown in their inoperative positions. For operation, the main switch 5 is closed. This causes a current to flow from lead L1 through segment 72 of switch RS, thence through coil 60 of relay VR to lead L2. If the line voltage is above the minimum operating value of relay VR, coil 60 is sufficiently energized to actuate its contacts. As a result, contacts 61 and 62 connect field winding 2 across the line through calibrating rheostat 7. At the same time, contacts 63, 64 and 65 are opened so that the rectifier 8 is disconnected from the armature 1. Contact 66 of relay VR closes also and establishes a self-holding circuit for coil 60 of relay VR. The armature 1 remains deenergized since both contactors RC and FC remain inoperative.

When now the master controller RS is moved from the off position to point 1 forward, the voltage responsive relay VR remains energized through its contact 66 as long as no voltage failure or interruption of current supply occurs. Coil 20 of contactor FC is now energized through segment 73 so that contacts 21, 22 and 23 are closed. The closure of contacts 21 and 22 connects the armature 1 across the line for operation in the forward running direction. Simultaneously, contact 23 closes the energizing circuit of coil 50 so that contact 51 of the brake relay BR opens thereby interrupting the circuit of resistor 9. Segment 74 of switch RS provides also energization for coil 30 of accelerating relay 1A so that contact 31 short-circuits the starting resistor 32. Hence, only resistor 42 remains effective in the armature circuit. When now turning the switch RS to point 2 forward, coil 40 is also energized through segment 74 so that contact 41 shorts the resistor 42, thereby placing the armature under full excitation.

In order to operate the motor in the reverse direction, switch RS is successively placed on point 1 and point 2 reverse. This causes the contactor RC to be energized through segment 75 while contactor FC remains inoperative. The accelerating relays 1A and 2A become effective in the same sequence as described in the foregoing so that the motor accelerates to full speed except that its running direction is reversed.

For stopping the motor switch RS is turned to its off position. This has the effect of deenergizing the line contactor FC or RC so that no further excitation is supplied to armature 1. At the same time, the opening of the interlock contact 23 or 13 disconnects coil 50 of brake relay BR so that resistor 9 is connected across armature 1 and provides for dynamic braking. Under normal conditions, however, the voltage relay VR remains energized through its contact 66 so that the field winding 2 remains connected to the line.

If during any of the above-mentioned operating stages the current supply is interrupted or if the energizing voltage drops below the safe value, the voltage relay VR drops out. This causes contacts 61 and 62 to disconnect the field winding 2 from the line. At the same time, the closure of contacts 63, 64 ad 65 connects the input terminals of rectifier 8 across the armature 1 and closes the rectifier output circuit through field winding 2. As a result, the field winding 2 is now excited by the current induced in motor 1. Due to the effect of rectifier 8, the current flow through field winding 2 is always in the direction necessary for stopping the motor regardless of the running direction of the armature. If at the moment of voltage failure, the switch RS is not in its off position, the dropping out of the voltage relay has also the effect of deenergizing the brake relay BR as well as the reversing contactor FC or RC then in operation. This is due to the fact that in all positions of switch RS, excepting its off position, the energization for all relay coils extends from line L1 through contact 66. Hence, when this contact opens, its interrupts the energizing circuits of relays BR, FC, RC, 1A and 2A. Thus, the armature 1 is immediately disconnected from the line and its circuit is placed into the illustrated starting condition with relay BR closed for dynamic braking. In order to readjust the system for operation, the master controller RS must first be returned to its off position in order to pick up the voltage relay VR which then closes the contact 66, provided the voltage failure or other defect of the current supply is eliminated.

In the above-described manner, the system according to the invention secures a safe stopping of the motor whenever the current conditions are unsafe for obtaining a sufficient dynamic braking, thereby preventing damage to the apparatus or machine driven by the motor without requiring complicated auxiliary devices. It will be noted that the rectifier or valve arrangement is in operation only in cases of voltage disturbance and operates each time only during a decelerating period of limited duration. Consequently, this rectifier arrangement can be rated for temporary loads and hence may have relatively small dimensions.

It will be understood by those skilled in the art that a system of the type described in the foregoing may be modified as to details without departing from the gist and essential features of my invention as set forth in the claims following hereinafter.

I claim as my invention:

1. In combination, a reversible direct-current motor having an armature and a shunt field winding, direct-current supply means, controllable circuit means for selectively energizing said armature from said supply means for operation in both directions respectively, energizing means for said winding, a rectifier circuit, and a voltage responsive relay disposed for connecting said winding to said energizing means when the voltage of said supply means is above a given magnitude while connecting said windings across said armature through said rectifier circuit when said voltage is below said magnitude.

2. In combination, a reversible direct-current motor having an armature and a shunt field winding, direct-current supply means, controllable circuit means for selectively energizing said armature from said supply means for operation in both directions respectively, energizing means for said winding, a rectifier circuit, a voltage responsive relay disposed for connecting said winding to said energizing means when the voltage of said supply means is above a given magnitude while connecting said winding a cross said armature through said rectifier circuit when said voltage is below said magnitude, a dynamic braking resistor, and a relay controlled by said voltage responsive relay for connecting said resistor across said armature when said winding is connected across said armature.

3. A motor control system, comprising direct-current supply means, a reversible direct-current motor having an armature and a shunt field winding, two line contactors for energizing said armature for operation in both directions respectively, a motor control switch for selectively actuating said contactors respectively, energizing circuit means connected with said supply means for exciting said winding, a rectifier circuit, and a voltage responsive relay disposed for connecting said winding to said energizing means when the voltage of said supply means is above a given magnitude while connecting said winding across said armature through said rectifier circuit when said voltage is below said magnitude, said voltage responsive relay being associated with said switch and said contactors so as to permit actuating the latter only when said voltage is above said magnitude.

4. In combination, a reversible direct-current motor having an armature and a shunt field winding, direct-current supply means, controllable circuit means for selectively energizing said armature from said supply means for operation in both directions respectively, energizing means for said winding, a rectifier circuit, a voltage responsive relay disposed for connecting said winding to said energizing means when the voltage of said supply means is above a given magnitude while connecting said winding across said armature through said rectifier circuit when said voltage is below said magnitude, a dynamic braking resistor, and a relay controlled by said voltage responsive relay for connecting said resistor across said armature only when said voltage is below said magnitude.

5. In combination, a reversible direct-current motor having an armature and a shunt field winding, direct-current supply means, reversible contact means for connecting said armature to said supply means for operation in both running directions respectively, said winding being connected across said armature, a rectifier interposed between said winding and said armature for energizing said winding at a given polarity independent of the selected running direction of said armature, a dynamic braking resistor, and control means for connecting said resistor across said armature.

FREDERICK D. SNYDER.